United States Patent [19]

Aarts et al.

[11] Patent Number: 4,479,157
[45] Date of Patent: Oct. 23, 1984

[54] MOUNTING FOR A HEAD DRUM OF A HELICAL SCAN RECORDER

[75] Inventors: Petrus J. J. Aarts, Eindhoven, Netherlands; Harald Fleck; Karl Kocsisek, both of Vienna, Austria

[73] Assignee: U.S. Philips Corporation, New York, N.Y.

[21] Appl. No.: 389,536

[22] Filed: Jun. 18, 1982

Related U.S. Application Data

[63] Continuation of Ser. No. 144,730, Apr. 28, 1980.

[30] Foreign Application Priority Data

Sep. 5, 1980 [NL] Netherlands .................. 7903626

[51] Int. Cl.³ ............................................. G11B 5/48
[52] U.S. Cl. ................................. 360/104; 360/84; 403/374
[58] Field of Search ............... 360/104, 86, 107, 129; 403/373-374, 290, 334; 292/256.6; 24/16; 64/30 E, 30 D, 27 NM; 411/909, 360

[56] References Cited

U.S. PATENT DOCUMENTS

| 3,021,049 | 2/1962 | Settle | 403/374 X |
| 3,165,342 | 1/1965 | Anderson | 403/374 |
| 3,396,596 | 8/1968 | Fischer | 403/374 X |
| 4,110,054 | 8/1978 | Moeller, Jr. | 403/373 |
| 4,197,565 | 4/1980 | Watanabe | 360/84 X |

FOREIGN PATENT DOCUMENTS

| 345577 | 9/1978 | Austria . | |
| 2354902 | 7/1975 | Fed. Rep. of Germany | 403/374 |
| 1046938 | 10/1966 | United Kingdom | 403/373 |

Primary Examiner—John H. Wolff
Attorney, Agent, or Firm—David R. Treacy

[57] ABSTRACT

A symmetrical mounting arrangement for a detachable head drum of a helical scan tape recorder in which a deformable sleeve extends from the drum along the drive spindle with a small clearance, and a clamping ring surrounding the sleeve exerts pressure uniformly to clamp the spindle and accurately center the drum on the spindle.

11 Claims, 11 Drawing Figures

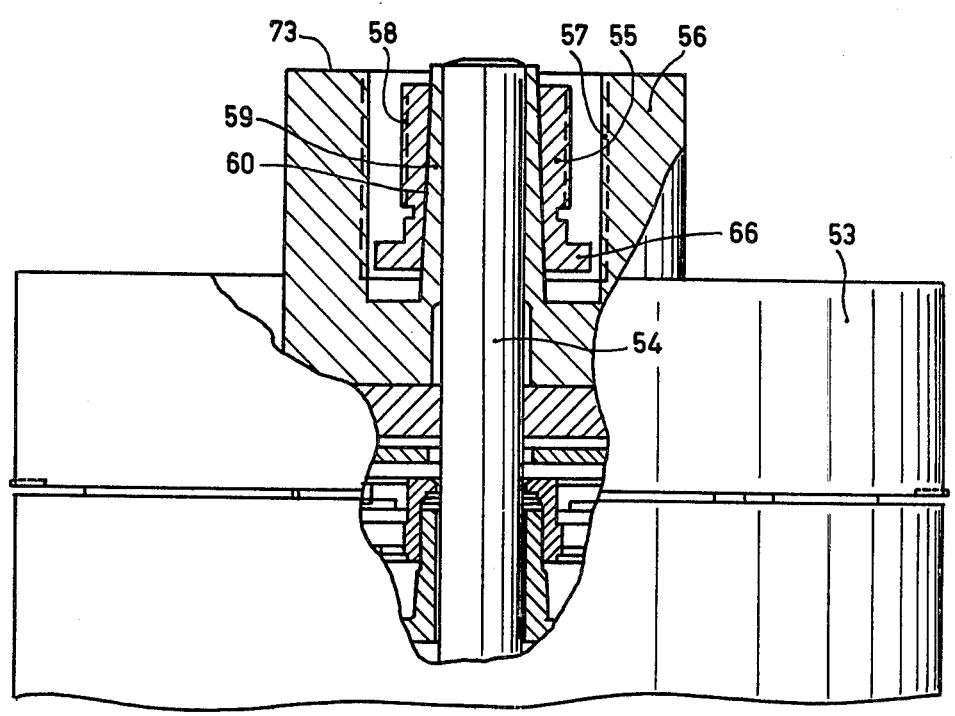
FIG. 8
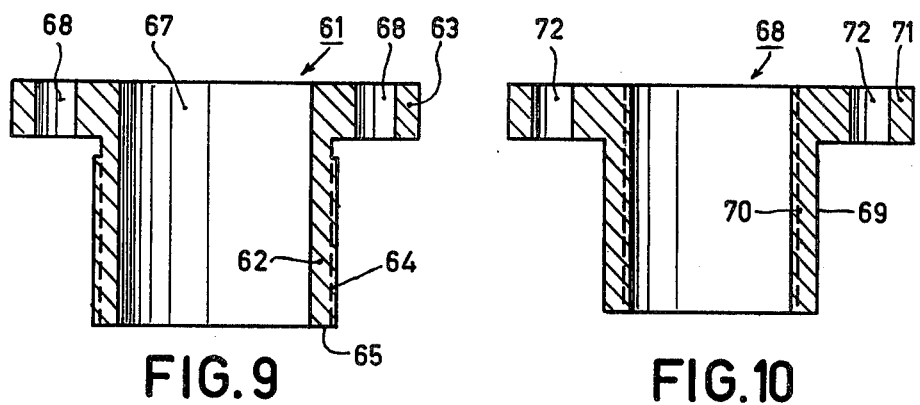
FIG. 9                    FIG. 10

MOUNTING FOR A HEAD DRUM OF A HELICAL SCAN RECORDER

This is a continuation, of application Ser. No. 144,730, filed Apr. 28, 1980.

BACKGROUND OF THE INVENTION

The invention relates to a helical scan tape recorder such as a video tape recorder, having at least one magnetic head mounted on a head support, rotatable about a drive spindle axis; and in particular to such a recorder whose head support is detachable from the drive spindle. The support includes an elastically deformable sleeve which is deformed to clamp against the drive spindle by a clamping ring.

Such an apparatus is known from Austrian patent specification AT-PS 345577. In this known apparatus the head disc consists of a cylindrical head drum which constitutes the rotary part of a drum unit for guiding the magnetic tape in a helical path. In addition to the rotary head drum the drum unit further comprises a stationary drum which is coaxial therewith and which is spaced therefrom by a narrow gap only. The stationary drum comprises a guide edge for the magnetic tape, which extends helically over a part of the circumference. Owing to its rotation the rotary head drum locally produces a film of air between the magnetic tape and the drum unit. As a result of this the friction between the magnetic tape and the drum unit is reduced. On its side which is remote from the stationary drum, the head drum includes an integral clamping sleeve having a cylindrical outer surface. A clamping ring, formed with a slot in the ring wall, is arranged around the clamping sleeve so that the parts of the clamping ring which are spaced from each other by the slot can resiliently be moved towards each other. On the one side of the slot a screw bolt is fitted in the clamping ring and extends with clearance through the clamping ring on the other side of the slot. By tightening the screw bolt the clamping ring is deformed between its released position and its clamping position, so that the clamping sleeve of the head drum is also deformed and the head drum is centered and clamped on the drive spindle.

For a most economic use of the magnetic tape in video recorders the magnetic tape is provided with a pattern of adjacent signal tracks which is as dense as possible. With modern video recorders slightly overlapping signal tracks are used having a width of approximately 40 microns and having a distance between the centers of the tracks of approximately 30 microns. The track length is approximately 100 mm. Over the entire length the tracks should be situated within very narrow tolerances, in particular because great value is attached to the possibility of being able to play back on one video recorder programs recorded on other video recorders without a noticeable loss of quality. A really successful interchangeability of cassettes, provided with recorded programs, and video recorders is obtained only if a video programs recorded on one video recorder can be played back on another video recorder without a perceptible loss of quality of the signal reproduced by the video recorder. This requirement is referred to as the compatibility of video recorders and magnetic tape cassettes, together belonging to a standard system for recording and reproducing video signals. As a result of this only very small tolerance ranges are available for the position of the magnetic heads relative to the stationary tape guide edge. In video recorders, which are equipped with a plurality of magnetic heads, such as helical scan video cassette recorders adapted for domestic use, it is essential that the two heads are also accurately positioned relative to each other in view of the synchronism of the signals which are recorded or read by the two heads. Also in this case only small tolerance ranges are available, because otherwise visible time errors will appear in the reproduced video picture, i.e. instabilities will occur near the edge of the picture.

In view of the stringent accuracy requirements imposed on the position of the magnetic heads, special optical precision instruments are generally used for mounting the magnetic heads on the head support. In the case of detachable head supports for helical scan recorders described above centered the head support is first centred and mounted on a special mounting spindle with the aid of its own clamping device. After mounting and adjustment of the magnetic heads the head support is removed from the mounting spindle by releasing the clamping device, after which the head support may be mounted on the drive spindle of a video recorder. Obviously, it is essential that the adjustments performed with the aid of the special mounting spindle are most accurately reproduced after the magnetic head support has been mounted on the drive spindle of a video recorder. In this respect a disadvantage of the known apparatus is that owing to the nature of the clamping device used the head support is clamped on two parts of the periphery of the clamping sleeve which are not predetermined. The location of these parts is not predetermined, which will give rise to an eccentricity of unpredictable magnitude and orientation when the head support is mounted on a drive spindle. These effects are caused by the fact that when the split clamping ring is tightened the clamping sleeve is deformed more or less to an oval, until the clearance between the clamping sleeve and the drive spindle is eliminated locally. In the bore of the head support, which has been deformed to an oval, the drive spindle is disposed at a location which depends on random factors, such as the initial position of the drive spindle in the bore. Another disadvantage of the known video recorder is that both mounting and removal of the head support in and from a video recorder is complicated by the fact that the screw bolt of the clamping ring is manipulated in a direction perpendicular to the axis of rotation of the drive spindle.

SUMMARY OF THE INVENTION

It is the object of the invention to provide a helical scan tape recorder with a detachable head support, having a clamping device which enables a more reproducible position of the head support relative to a spindle to be obtained. The invention is characterized in that the clamping ring has an uninterrupted structure in the circumferential direction (it is circular symmetrical) and locally exerts a clamping pressure on the clamping sleeve by symmetrical radial deformation, which pressure is distributed substantially uniformly over the circumference.

Thus, by an omnilateral symmetrical deformation of the clamping sleeve a clamping is obtained by such a kind that the clamping sleeve is not deformed to an oval. The slight initial clearance between the drive spindle and the clamping sleeve is eliminated completely, so that a satisfactorily reproducible alignment of the head support relative to the drive spindle is obtained. Moreover, the invention is particularly suitable for providing embodiments in which the clamping ring can be mounted and removed in an axial direction.

An embodiment in which the clamping ring can be mounted and removed axially is characterized in that the clamping ring has a conical inner wall with a surface which forms part of the generated surface of an imaginary cone, having an axis and having an apex angle $\alpha$ between a generatrix of the generated surface and the axis; in that the clamping ring is expanded from the released position to the clamping position by an axial movement over the clamping sleeve, through cooperation with a part of the outer surface of the clamping sleeve; and in that the angle $\alpha$ is smaller than the angle of friction $\rho$ of the materials used for the clamping sleeve and the clamping ring, so as to prevent the clamping ring from being moved back to the released position in an axial direction as a result of the axial components of the clamping forces exerted on it in the clamping position through the frictional forces prevailing between the clamping sleeve and the clamping ring. The angle of friction $\rho$ is, as is customary, defined as the arc tangent of the quotient of the frictional force and normal force acting on surfaces which are in frictional contact with each other and may be regarded as a constant whose value depends solely on the type and nature of the materials of which the frictional surfaces are made. The clamping sleeve may externally have a conical shape corresponding to the conical shape of the inner wall of the clamping ring. However, an embodiment is considered to be even more advantageous in which the clamping sleeve is externally provided with a shoulder which is concentric with the axis of rotation of the drive spindle for cooperation with the conical inner wall of the clamping ring, so that the clamping sleeve is deformed by the clamping ring at a location which is accurately defined by the shoulder. Both embodiments are simple and require few parts, the last-mentioned embodiments having the additional advantage that the symmetrical radial deformation of the clamping sleeve always occurs on a part of the clamping sleeve which is well-defined in an axial direction. In the case of a clamping sleeve with a conical outer surface and without a shoulder the axial position of the radial deformation is not defined unambiguously and depends on the extent to which the clamping ring is deformed. It is evident that the axial position of the mounted clamping ring also determines the magnitude of the clamping pressure between the clamping ring and the clamping sleeve. Furthermore, the thickness of the clamping sleeve at the location of the clamping ring and the elasticity of the clamping sleeve also play a part.

In view of the precision with which apparatus of the type mentioned in the preamble is manufactured the drive spindle and the magnetic-head support should be handled with the greatest care during assembly and disassembly operations. Therefore, it is undesirable to exert axial or radial forces on the drive spindle when mounting or removing the clamping ring on or from the clamping sleeve. In this respect an embodiment of the invention is of interest, which is characterized in that the head support is provided with a collar which is coaxial with the clamping sleeve for taking up reaction forces exerted on the head support by auxiliary tools which serve for tightening or releasing the clamping ring on the clamping sleeve. Thus, the head support is adapted to cooperate with assembly and disassembly tools. The forces required for pressing home or extracting the clamping ring act directly on the head support itself, so that no external forces are exerted on the drive spindle.

In a further embodiment different means are provided for this purpose. This embodiment is characterized in that the head support is provided with a threaded bushing with internal screw-thread, which is concentrically situated around the clamping ring, for axially moving the clamping ring from its released position to its clamping position with the aid of an auxiliary tool which cooperates with the screw-thread, and that the clamping ring is provided with external screw-thread for axially moving the clamping ring from its clamping position to its released position with the aid of an auxiliary tool which cooperates with said screw-thread. Even when simple hand-operated tools are used, this embodiment prevents at least external axial forces, and partly also external radial forces, from being exerted on the drive spindle. The head support should merely be retained, for example by hand, so as to prevent rotation.

Yet another embodiment employs a different technique for obtaining the desired clamping pressure, which is uniformly distributed over the circumference, on the clamping sleeve and is characterized in that the clamping ring consists of a material which is radially deformable under the influence of axial compression; in that a pressure sleeve is arranged concentrically around the clamping sleeve, leaving an annular space for the clamping ring; in that an axially movable clamping-ring compressor cooperates with the clamping ring for axially compressing the clamping ring; in that the head support is provided with a clamping ring stop at some axial distance from the free end of the clamping sleeve; and in that displacement means cooperate with the clamping-ring compressor for moving the clamping ring compressor in a direction towards the clamping ring stop, so as axially to compress the clamping ring between its released position and its clamping position in the space between the clamping sleeve, the pressure bush, the clamping ring stop and the clamping ring compressor, and thus exert the clamping pressure, which is uniformly distributed over the circumference, on the clamping sleeve. For the clamping ring for example a plastic material may be used consisting of 85% polyvinylchloride and 15% plasticizer, or alternatively a polytetrafluororoethylene can be used. The last-mentioned material has the advantage of a low coefficient of friction. Such materials in themselves are not suitable to exert a pressure of an accurately defined magnitude, i.e. with a low temperature-dependence, because the coefficient of cubical expansion is comparatively high, for example $220 \times 10^{-6}$ per C° for the first mentioned material. However, this need not always present a problem for the object pursued by the invention. A more complete description of techniques employing a plastic mass for the transmission of pressure is found in relevant literature, for example the article "Werkstückspanner mit plastischer Masse als Druckübertragungsmittel", Teil 2, "Zeitschrift für praktische Metallbearbeitung", Jahrgang 63, 31 Juli 1969, Heft 12, pp. 662 through 666, (Dipl-Ing. Heinrich Matuszewski) (herewith incorporated by reference). According to a particular preferred embodiment the displacement means comprise a coupling nut which is situated coaxially around the clamping sleeve and which cooperates with the clamping ring compressor with an annular pressure surface, as well as a threaded bushing with screw-thread for the coupling nut, which bushing is disposed on the head support concentrically around the clamping ring.

BRIEF DESCRIPTION OF THE DRAWINGS

The invention will be described in more detail with reference to the drawing, which schematically represents three embodiments of the invention, and in which:

FIG. 8 shows a similar drum unit as FIG. 3, but having a different embodiment of the invention, FIG. 9 shows a simple auxiliary tool for moving the clamping ring of the embodiment of FIG. 8 from its released position to its clamping position, FIG. 10 shows a simple auxiliary tool for moving the clamping ring of the embodiment of FIG. 8 from its clamping position to its released position.

DESCRIPTION OF THE PREFERRED EMBODIMENTS

Figure 1:
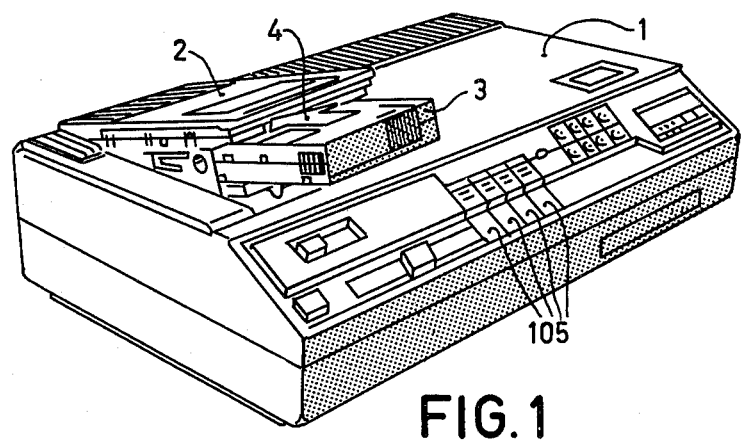
FIG. 1 is a perspective view of a helical scan video recorder with swung-open cassette holder which can accommodate a magnetic tape cassette.
Figure 2:
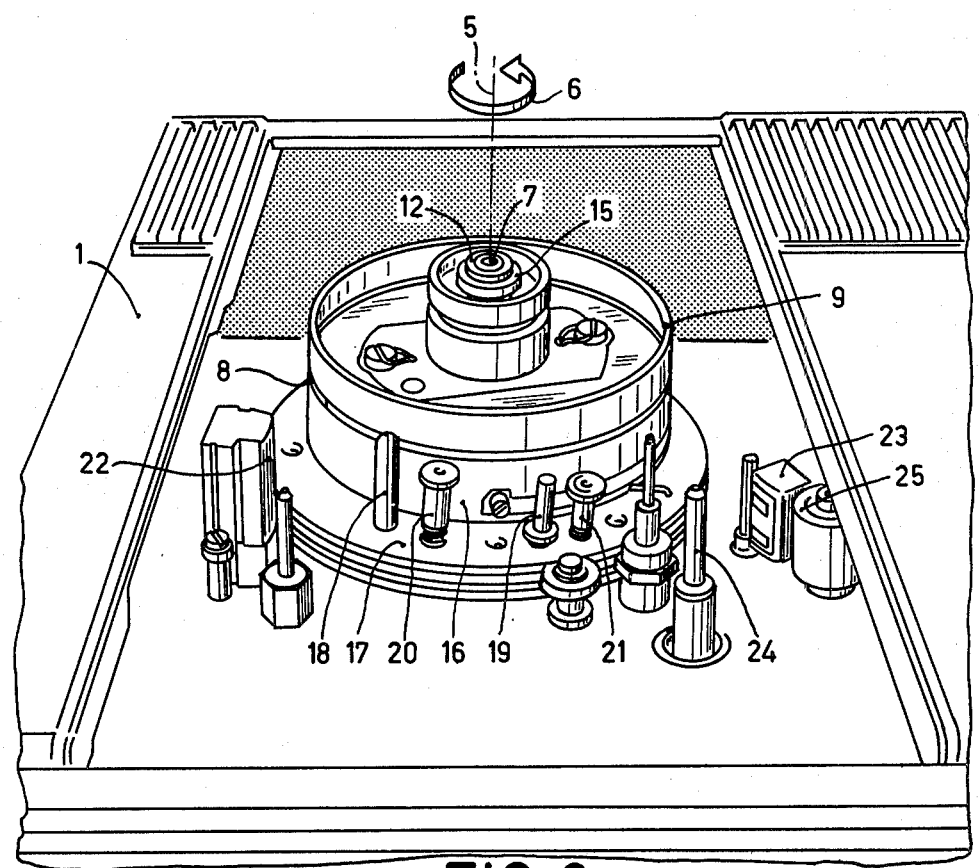
FIG. 2 is a different perspective view on a slightly enlarged scale, of a part of the video recorder of FIG. 1, the cassette holder being removed.

FIG. 1 shows a helical scan video recorder of a conventional type and suitable for magnetically recording and reading video signals in interrupted signal tracks which extend obliquely adjacent each other on a magnetic tape. A cassette holder 2 is pivotably journalled to the housing 1 of the video recorder. A magnetic tape cassette 3 may be inserted into the cassette holder in the direction of the arrow 4. When the cassette has been inserted completely the cassette holder can be swung down, the cassette being brought into its operating position, in which the magnetic tape can be extracted from the cassette with the aid of means provided for this purpose in the video recorder, so as to bring the magnetic tape into contact with magnetic heads of the video recorder. The usual controls, such as for example a number of control buttons 105, are located on the housing 1. FIG. 2 again shows a part of the video recorder of FIG. 1, but now with the cassette holder removed, so that at least a part of the interior of the video recorder is visible. The video recorder comprises an at least partly cylindrical drive spindle 7 with a free end, which drive spindle is rotatable about an axis of rotation 5 in the direction of the arrow 6. Two diametrically opposed magnetic heads 8, one of which is shown in FIG. 2, rotate about the axis of rotation 5 of the drive spindle 7. These magnetic heads serve for recording and/or reading the oblique signal tracks on the magnetic tape of the magnetic tape cassette 3. The magnetic tape itself, as well as the tracks which extend obliquely on the tape, are not shown for the sake of simplicity, but are generally known per se. On the drive spindle 7, near its free end, a head support in the form of a rotary head drum 9 is mounted so as to be detachable, on which drum the two magnetic heads 8 are mounted.

Figure 3:
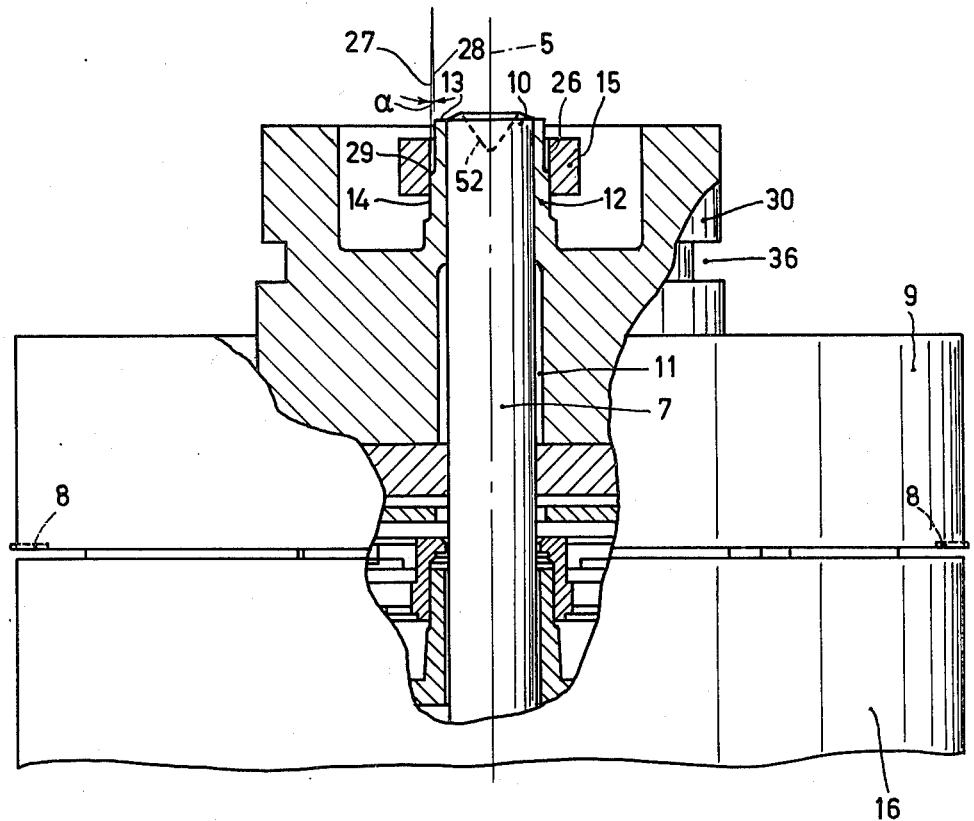
FIG. 3 is a side view, in cross-section, on an enlarged scale of a drum unit, comprising a rotatable head drum and a part of a stationary tape guide drum, of the video recorder of FIGS. 1-2.

The manner in which the head drum 9 is secured to the drive spindle 7 is most clearly shown in FIG. 3, which clearly shows that the head drum 9 is secured to a cylindrical portion of the drive spindle 7 near a free end 10 thereof. The head drum 9 is formed with a central through bore 11 for the passage of the drive spindle with some clearance. For detachably mounting the head drum 9 on the drive spindle 7 a clamping sleeve 12 having a free end 13 projects axially from the main portion of the drum 9, which sleeve is concentric with the axis of rotation 5 of the drive spindle 7, and comprises an elastically deformable wall portion of the head drum with an outer surface 14. A clamping ring 15 which is deformable between a released position and a clamping position, which ring in the clamping position deforms the clamping sleeve 12, eliminates the clearance between the drive spindle 7 and the clamping sleeve 12, so that the head drum 9 is centered and also clamped on the drive spindle 7.

Figure 4:
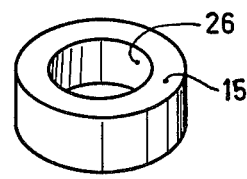
FIG. 4 is a perspective view of a clamping ring as used in FIG. 3 for centering and clamping the head drum on the drive spindle of the video recorder, FIGS. 5 and 6 in perspective show parts of a simple auxiliary tool, for moving the clamping ring of FIG. 4 from its released position to its clamping position on the head drum of FIG. 3, FIG. 7 in perspective, partly exploded, view shows a simple auxiliary tool for moving the clamping ring of FIG. 4 from its clamping position to its released position on the head drum of FIG. 3.

The clamping ring 15, also shown in FIG. 4, has an uninterrupted structure and through a radial deformation locally exerts a clamping pressure on the clamping sleeve 12, which pressure is substantially uniformly distributed over the circumference. In order to obtain a sufficiently high clamping pressure, and for a sufficiently accurate centering it is important that the clearance between the drive spindle 7 and the clamping sleeve 12, when the clamping ring is in its released position, is on the order of 15 microns, or preferably even less. In the case of a driven spindle diameter of 6 mm for example a fit may be used which is designated h5/H6 in the ISO system of fits. In accordance with this fit the drive spindle may have an undersize of maximum 5 μm and the bore in the head drum an oversize of maximum 8 μm.

FIG. 2 shows a number of parts of the mechanism of the video recorder 1 which are not of interest for the invention as such. A stationary drum 16 is coaxial with the rotary head drum 9. Around this stationary drum there is disposed an equally coaxial rotatable ring 17, which belongs to a threading mechanism which passes the magnetic tape in a helical path around a part of the drum unit, comprising the stationary drum 16 and the rotary head drum 9. For this purpose tape guide pins 18 and 19 and guide rollers 20 and 21 are located on the ring. Further, a stationarily mounted magnetic erase head 22 and an audio head 23 are shown as well as a capstan 24 and a pressure roller 25.

In the embodiment of the invention in accordance with FIGS. 2 through 4 the clamping ring 15 has a conical inner wall 26, whose cone axis in FIG. 3 coincides with the axis of rotation 5 of the drive spindle 7, the cone having an apex angle α. In FIG. 3 this angle is shown between a generatrix 27 of the generated surface of the conical inner wall 26 and an extension line 28 parallel to the axis of rotation 5. By an axial movement over the clamping sleeve 12, through cooperation with a part of the outer surface of the clamping sleeve, the clamping ring 15 has been expanded from a released position, which is situated nearer the end 13 of the clamping sleeve, to the clamping position shown in FIG. 3. The angle α is smaller than the friction angle φ for the materials used for the clamping sleeve and the clamping ring. Thus the frictional forces prevailing between the clamping sleeve 12 and the clamping ring 15 prevent the clamping ring 12 from moving back in an axial direction to its released position under the influence of the axial component of the clamping forces exerted on it in the clamping position. When an aluminum head disc 9 and a brass clamping ring 15 are used, the angle α may for example be 1° 30'.

The clamping sleeve 12 is externally provided with a shoulder 29, which is concentric with the axis of rotation 5 of the drive spindle 7, for cooperation with the conical inner wall 26 of the clamping ring 15, so that the clamping sleeve is deformed by the clamping ring 15 at a location which is accurately defined by the shoulder 29.

Figure 5:
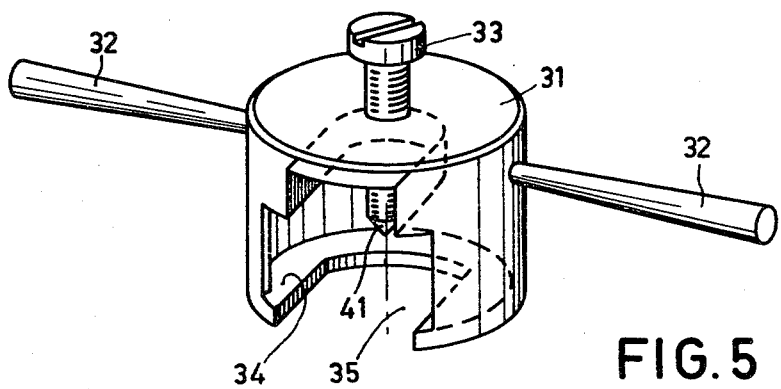
Figure 6:
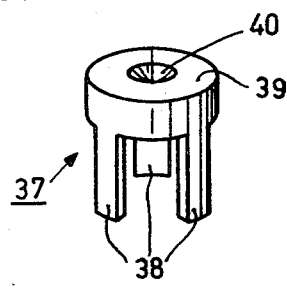

Mounting and removing the clamping ring 15 on and from the clamping sleeve 12 may be effected with fairly simple hand operated tools. FIGS. 5 and 6 show a tool for mounting the clamping ring and FIG. 7 a tool for removing it. The head drum 9 is provided with a collar 30, which is coaxial with the clamping sleeve 12, for taking up reaction forces exerted on the head support by the auxiliary tools. FIG. 5 shows a sleeve 31, to which pins 32 are secured on two diametrically opposed sides and in which at a central locational a thrust screw 33 can be screwed in and out in an axial direction. At the lower side the sleeve has an internal flange 34 with a substantially U-shaped opening 45. This opening is proportioned so that the sleeve 31 can be slid around the collar 30 of the head drum, the flange 34 engaging underneath the collar in a slot 36. Before the sleeve 31 is slid onto the head drum the clamping ring 15 is fitted on the clamping sleeve 12 and a clamping ring depressor 37, see FIG. 6, is placed on the clamping ring 15. The clamping ring depressor comprises three axially extending limbs 38, which bear on the upper surface of the clamping ring 15 around the clamping sleeve 12. In the upper surface 39 of the clamping ring depressor 37 a conical recess 40 is formed for receiving a conical end 41 of the thrust screw 33. The clamping ring 15 is pressed to its clamping position by tightening the screw 33, the conical end 41 of the screw engaging in the conical recess 40 and the screw 33 thus bearing on the clamping ring depressor 37. The two pins 32 on the sleeve 31 can be retained by hand in order to prevent the sleeve 31 from rotating as the screw 33 is tightened. The axial reaction forces of the auxiliary tool are transmitted to the collar 30 of the head drum 9 by the flange 34.

Figure 7:
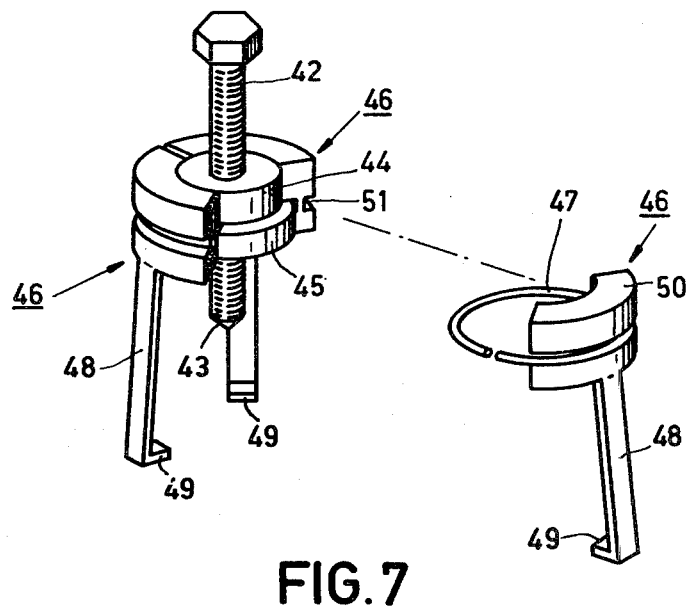

For removing the clamping ring use can be made of the auxiliary tool of FIG. 7, which comprises a screw 42 with a conical end 43, a ring 44 with a flange 45, three pivotable extraction members 46 and a resilient wire ring 47. The extraction members 46 are provided with an extraction limb 48 having a foot 49. The extraction limb 48 is connected to an upper portion 50 having an external surface which substantially constitutes a part of a cylinder and which is formed with a groove 51 for the wire ring 47. The upper portion 50 of each extraction member 46 bears on the flange 45 and is resiliently urged against the outside of the ring 44 with the aid of the wire ring 47. The extraction members 46 are mounted on the ring 44 so as to be slightly movable, so that the extraction limbs 48 can be pivoted slightly outwards, i.e. at least so far that the feet 49 can be fitted over the clamping ring 15. The conical end 43 of the screw 42 is fitted into a conical recess 52 in the free end 10 of the drive spindle 7. When the screw 42 is tightened, the feet 49 are moved upwards until they are positioned against the underside of the clamping ring 15. When the screw is further tightened the clamping ring is extracted. The axial reaction force of this tool is transmitted directly to the drive spindle 7.

FIG. 8 shows a different embodiment of the invention. A head drum 53 is mounted on a drive spindle 54 with the aid of a clamping ring 55. For detachably mounting the head drum on the drive spindle the head drum is provided with a threaded extension 56 with internal screw-thread 57, which extension is concentric with a clamping sleeve 59, for axially moving the clamping ring 55 from its released position to its clamping position by means of an auxiliary tool, shown in FIG. 9, which cooperates with the internal thread. The clamping ring is provided with external thread 58, for axially moving the clamping ring from its clamping position to its released position with the aid of an auxiliary tool, shown in FIG. 10, which cooperates with the screw-thread. The clamping sleeve 59 has a conical outer surface 60, whose shape corresponds to the conical inner surface of the clamping ring 55.

The auxiliary tool 61, see FIG. 9, for mounting the clamping ring 55 comprises a threaded bushing 62 having a flange 63. The external thread 64 on the bushing 62 is adapted to cooperate with the internal thread 57 in the extension 56 of the head drum 53. The underside 65 of the threaded bushing 62 is pressed against a flange 66 at the lower side of the clamping ring 55. A bore 67 in the threaded bushing 62 has such a diameter that the clamping ring 55 can be accomodated in this opening. In the flange 63, whose diameter corresponds to the diameter of the extension 56 of the head drum 53, two cylindrical holes 68 are formed. These holes serve for receiving pins of a pin spanner for tightening the threaded bushing 62.

FIG. 10 shows an auxiliary tool 68 for removing the clamping ring 55. This auxiliary tool a threaded sleeve 69, which is provided with an internal screw-thread 70. This screw-thread is adapted to cooperate with the screw-thread 58 on the outside of the clamping ring 55. The threaded sleeve 69 has an integral flange 71, which has an outer diameter which is equal to that of the threaded extension of the head drum 53. In the flange 71 holes 62 are formed for the pins of a pin spanner. When the clamping ring 55 is removed the flange 71 bears on the upper surface 73 of the extension 56 of the head drum 53. If desired, a plastic ring may be inserted so as to reduce friction.

Figure 11:
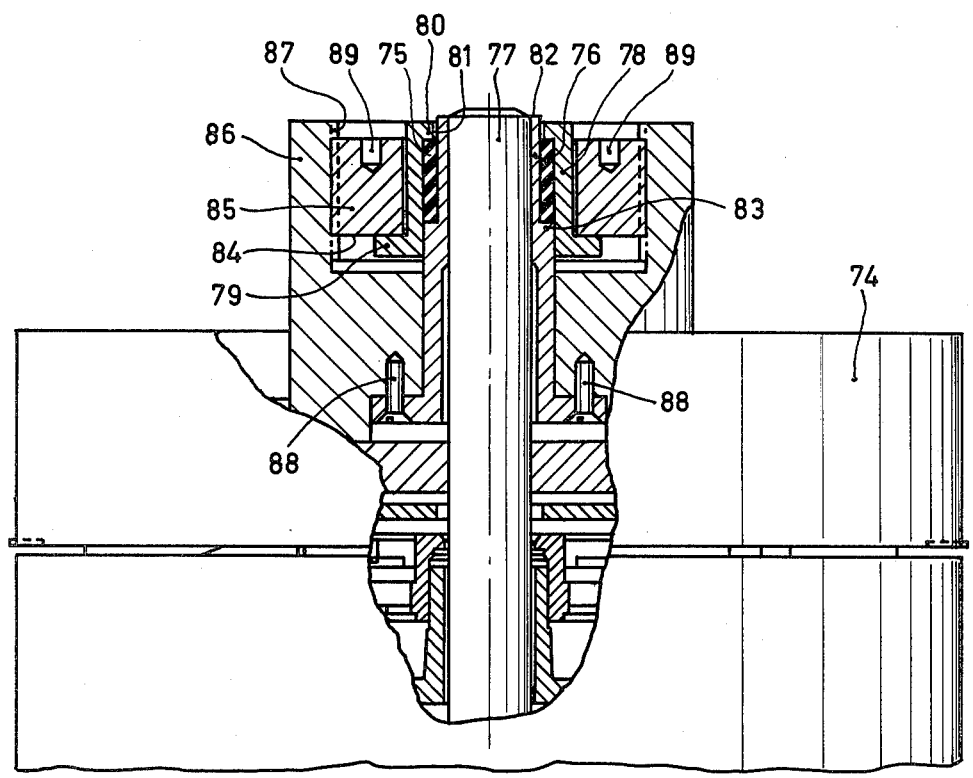
FIG. 11 shows a similar drum unit as FIGS. 3 and 8 in still another embodiment of the invention.

In FIG. 11 a head drum 74 is provided with a different embodiment of the invention, employing a clamping ring 75 which consists of a material which is radially deformable under the influence of axial compression, such as for example polytetrafluoroethylene. A clamping sleeve 76 which serves for the centered mounting of the head drum 74 on a drive spindle has a cylindrical shape. Concentrically with the clamping sleeve 76 there is provided a pressure sleeve 78, so that an annular space is left in which the clamping ring 75 can be accommodated. For axial compression of the clamping ring 75 an axially movable clamping ring compressor 80 cooperates with a lower external flange 79 of the pressure sleeve 78. The; sleeve 78 is formed with a central opening 81 for the passage of the free end 82 of the clamping sleeve 76. At some axial distance from the free end 82 of the clamping sleeve 76 the head disc is provided with a clamping ring stop 83. By moving the clamping ring compressor 80 towards the clamping ring stop 83, the clamping ring 75 is axially compressed, from its released position to its clamping position, in the space between the clamping sleeve 76, the pressure sleeve 78, the clamping ring stop 83 and the clamping ring compressor 80. As a result of this axial compression the clamping ring 75 is subject to a radial deformation, so that a clamping pressure, which is uniformly distributed over the circumference, is exerted on the clamping sleeve 76 by the clamping ring. For axial movement of the clamping ring compressor 80 a coupling nut 85 engages the flange 79 of the pressure sleeve 78 and clamping ring compressor 80 through an annular thrust surface 84, coaxial with the clamping sleeve 76. The coupling nut 85 is screwed into a tubular extension 86 which extends coaxially from the drum 74, and which has an internal thread 87. The coupling nut has two holes 89 for pins of a pin spanner by means of which the coupling nut can be tightened or slackened. When slackening the coupling nut the clamping ring 75 returns from the clamping position to the released position under the influence of its own elasticity. In this respect it is of advantage that the friction occurring between the inner wall of the clamping ring and the outer wall of the clamping sleeve presents a minimal resistance of the clamping ring during its axial expansion due to the fact that the clamping ring is made of tetrafluorethylene.

In the embodiments of FIGS. 3 and 8 the clamping sleeves 12 and 59 are respectively integral with the head discs 4 and 53. However, FIG. 11 illustrates that this is not necessary. In this embodiment the clamping sleeve 76 is a separate component which is connected to the head disc 74 by means of screws 88. Within the scope of the invention many variants are possible, so that the invention is not limited to the embodiments shown, but rather applies to all those embodiments which employ the idea underlying the invention as defined in the claims.

What is claimed is:

1. A helical scan tape recorder/reproducer comprising an at least partly cylindrical drive spindle having a free end, rotatable about an axis of rotation; at least one magnetic head; a head support to which the magnetic head is secured, having a central bore for passage of the drive spindle therethrough with limited clearance, and means for detachably mounting the head support on the drive spindle near said free end, said means for detachably mounting comprising a circular symmetrical clamping sleeve formed as a unitary part with and extending axially from the head support and having a free end, said sleeve having an elastically deformable wall portion concentric with said axis of rotation, and having an outer surface; and clamping ring means for deforming said sleeve to eliminate clearance between the drive spindle and the clamping sleeve, characterized in that the clamping ring is a circular symmetrical unitary element deformed to be in tension, whereby exerting clamping pressure substantially uniformly over the circumference of said outer surface so as to cause symmetrical radial deformation of said clamping sleeve.

2. A recorder/reproducer as claimed in claim 1, characterized in that said clamping sleeve outer surface is a cylindrical surface terminating in a shoulder and that said clamping ring has a conical inner surface engaging said outer surface at the shoulder so as to deform the clamping sleeve at an accurately defined location.

3. A recorder/reproducer as claimed in claim 2, characterized in that said support comprises means for taking up reaction forces exerted by auxiliary tools used for moving said clamping ring with uniform axial motion to tighten or release said ring.

4. A recorder/reproducer as claimed in claim 3, characterized in that said means for taking up forces include a tubular extension of the support having an internal screw thread concentric with said clamping sleeve, and an external screw thread on said clamping ring.

5. A helical scan tape recorder/reproducer comprising an at least partly cylindrical drive spindle having a free end, rotatable about an axis of rotation; at least one magnetic head; a head support to which the magnetic head is secured, having a central bore for passage of the drive spindle therethrough with limited clearance, and means for detachably mounting the head support on the drive spindle near said free end, said means for detachably mounting comprising a circular symmetrical clamping sleeve formed as a unitary part with and extending axially from the head support and having a free end, said sleeve having an elastically deformable wall portion concentric with said axis of rotation, and having an outer surface; and clamping ring means for deforming said sleeve to eliminate clearance between the drive spindle and the clamping sleeve, characterized in that the clamping ring consists of a circular symmetrical mass of a material which is radially deformable as a result of axial compression, and that said means for detachably mounting further includes a pressure sleeve arranged concentrically around the clamping sleeve so as to define an annular space therebetween, said head support having a circular symmetrical clamping ring stop surface at an end of said outer surface remote from said free end for defining an end of said annular space, and a circular symmetrical axially movable clamping ring compressor for defining the other end of said annular space, and displacement means for moving said clamping ring compressor toward the clamping ring stop surface so as to compress the clamping ring axially and uniformly, whereby said clamping ring is deformed radially inwardly and exerts clamping pressure on the clamping sleeve.

6. A recorder/reproducer as claimed in claim 5, characterized in that said displacement means includes a tubular extension of said head support having an internal thread, and a coupling nut disposed coaxially around the clamping sleeve and engaging said internal thread, arranged to abut said clamping ring compressor and displace said compressor axially upon turning the nut.

7. A device for mounting a drum on a spindle having an axis and a cylindrical surface concentric about said axis, comprising a circular symmetrical deformable cylindrical clamping sleeve formed as a unitary part with and extending axially from the drum and having an outer surface terminating at a shoulder, and a circular symmetrical clamping ring which is a unitary element having a conical inner surface, deformed elastically to be in tension, arranged symmetrically around said clamping sleeve with the conical surface engaging said shoulder, thereby exerting clamping pressure substantially uniformly over the circumference of said clamping sleeve at an accurately defined location, to deform and clamp the clamping sleeve against the spindle cylindrical surface.

8. A device as claimed in claim 7, further comprising means for taking up reaction forces exerted by auxiliary tools used for moving said clamping ring axially and uniformly to tighten or release the ring, whereby unbalanced forces on the spindle are eliminated when mounting or detaching the drum from the spindle.

9. A device as claimed in claim 8, wherein said means comprise a tubular extension of said drum having an internal thread.

10. A device for detachably mounting a drum on a spindle having an axis and a cylindrical outer surface concentric about said axis, comprising a circular symmetrical cylindrical clamping sleeve formed as a unitary part with and extending axially from the drum and having an outer surface extending from a stop shoulder toward a free end of the clamping sleeve; a pressure sleeve arranged concentrically about the clamping sleeve, and an axially movable clamping ring compressor arranged concentrically with said clamping sleeve between the stop shoulder and the free end of the sleeve, said outer surface, pressure sleeve, stop shoulder and ring compressor defining an annular space therebetween; a clamping ring consisting of a circular symmetrical mass of a material which is radially deformable as a result of axial compression, disposed in said annular space; and displacement means for uniformly axially moving the clamping ring compressor toward the stop shoulder so as to elastically and symmetrically deform the clamping ring by compressing it axially, whereby said clamping ring deforms radially inwardly and exerts a uniformly distributed clamping pressure over the outer surface of the clamping sleeve, deforming the clamping sleeve symmetrically and clamping it to the spindle.

11. A device as claimed in claim 10, characterized in that said displacement means includes a tubular extension of said head support having an internal thread, and a coupling nut disposed coaxially around the clamping sleeve and engaging said internal thread, arranged to abut said clamping ring compressor and to displace said compressor axially upon turning the nut.

* * * * *